United States Patent Office 3,536,508
Patented Oct. 27, 1970

3,536,508
SOLUTIONS OF A TERPENE RESIN AND
A CELLULOSE ETHER
Oliver A. Short, Wilmington, Del., assignor to E. I. du Pont de Nemours and Company, Wilmington, Del., a corporation of Delaware
No Drawing. Continuation-in-part of application Ser. No. 617,855, Feb. 23, 1967. This application May 27, 1969, Ser. No. 828,346
Int. Cl. C08b 21/32; H01b 3/30
U.S. Cl. 106—173                                    14 Claims

ABSTRACT OF THE DISCLOSURE

Liquid vehicles which are usable in forming conductor, capacitor, resistor and dielectric compositions, comprising a solvent mixture, a terpene resin (e.g., hydrogenated rosin), and a binder (e.g., ethyl cellulose) in critical proportions. Metallizing compositions containing these vehicles are printed and fired on organic bonded ceramic dielectrics or matured dielectric substrates to form electrodes and/or microcircuitry.

CROSS-REFERENCES TO RELATED APPLICATIONS

This in a continuation-in-part of Ser. No. 617,855, filed Feb. 23, 1967, now abandoned.

BACKGROUND OF THE INVENTION

Deyrup, U.S. Pat. No. 2,389,420, describes the preparation of multiplate monolithic ceramic capacitors employing a technique involving spraying a slurry of a finely divided ceramic dielectric material onto a base surface, drying the same, and then superimposing thereon a layer of finely divided conductive metal, e.g., silver, in paste form. The silver layer is usually applied by screen stencilling the silver paste in the desired pattern, later to serve as the capacitor electrode or plate. As many alternate layers as desired of ceramic dielectric and silver electrodes may be built up in this manner, with the bottom-most and the upper-most layers being dielectric layers. Alternate silver layers are offset slightly so as to be exposed at opposite sides of the capacitor structure, which structure is then fired at the fusing or sintering temperature of the dielectric material to form a monolithic capacitor structure. The alternate electrode layers or plates exposed at opposite sides of the fired capacitor are then silvered with a silver paint or paste. After again being fired, the fired silvered edge in one side connects all alternate plates exposed on that side, while the opposite silvered edge similarly connects all alternate plates exposed on that side. Lead wires are then attached, e.g., by soldering to the silvered edges.

An improved modification of the method of the above patent involves the use of thin pre-formed sheets, films or strips of "green" ceramic dielectric material. Such sheets are first coated, e.g., by screen stencilling, with a noble metal electrode coating in the desired pattern, following which the sheets are stacked to provide alternate dielectric and electrode layers with alternate electrode layers exposed on opposite edges of the stack. The stack is compressed under pressure (100–25,000 p.s.i.) then fired to provide the monolithic multiplate capacitor. The noble metal component of the electrode should be a metal which will not melt at the firing temperature. The edges with exposed electrodes are metallized with a conductive metal paint. This can be done before the stack is fired, or after such firing, depending upon the firing temperature required and the metal paint utilized. If the edges are so metallized after the stack has fired, a second firing will be required to fire such conductive paint to the edges.

By "green" vitreous dielectric material is meant an unfired admixture, e.g., in a preformed shape such as a sheet, film or strip, comprising a particulate vitreous dielectric material such as glass, barium titanate, lead zirconate, bismuth stannate, and titanium dioxide, and a temporary resinous organic binder therefor. The particulate conductive metal component of the electrode paste employed in forming the electrode coating is generally a noble metal such as silver, gold, palladium, platinum, rhodium, ruthenium, osmium, iridium, or mixture or alloys of two or more thereof. The noble metal which is used depends on the dielectric in the green sheet and the ultimate firing temperature.

The organic binder component of the green dielectric sheet should have good burning properties and should yield a sheet which is flexible; otherwise, cracks and other defects occur during their handling. It is also highly important, if not essential, that the liquid vehicle in which the noble metal electrode material is applied to the green dielectric sheet not be a solvent for the resinous organic binder component of the green dielectric sheet, and that the vehicle used does not attack the organic binder of the dielectric of the sheet more than is necessary to produce a satisfactory bond, that it dry without shrinking in a few hours, and that it not be tacky after complete removal of solvent. Otherwise, objectionable curling, cracking, and/or deformation of the electrode coated sheets result during the stacking, compressing and firing operations.

Thus, there is a need in the art for improved metallizing compositions which are usable in forming electrical conductors. More specifically, there is an eminent need for improved metallizing compositions which can be applied to green ceramic dielectric sheets in the production of such capacitors without causing the curling, blistering, cracking, or penetration of such sheets as encountered heretofore. In addition, there is a general need in the electronics industry for vehicles which have better wetting and printing characteristics for use in conductor, resistor and/or dielectric compositions.

SUMMARY OF THE INVENTION

This invention relates to vehicles comprising (A) 40–90% by weight of a solvent mixture which consists essentially of (1) a first solvent which is an aliphatic hydrocarbon containing 6–16 carbon atoms and (2) a second solvent from the group consisting of (a) an aromatic hydrocarbon solvent boiling in the range of 150–320° C., (b) a terpene solvent, and (c) a mixture thereof, said second solvent constituting 10–60% by weight of said solvent mixture; (B) 5–35% by weight of a terpene resin selected from the group consisting of rosin, hydrogenated rosin and the glycerin ester of hydrogenated rosin; (C) 4–15% by weight of a binder selected from the group consisting of ethyl cellulose and ethyl hydroxyl ethyl cellulose; and (C) 0–10% by weight of a thixotropic agent. The metallizing compositions of the invention comprise dispersions of a finely divided noble metal, mixture of two or more noble metals, an alloy of two or more noble metals or a mixture of two or more such alloys, in the above-defined liquid vehicle.

The particular combination of liquids which comprise the vehicles of this invention produce solutions or carrier liquids which are well suited for use as carriers for particulate noble metal in the application of the latter to green dielectrics ceramic sheets or matured (fired) ceramic sheets. The green ceramics generally comprise thin flexible sheets of mixtures of particulate ceramic dielectric material and a temporary organic resin binder which is most generally a solid ethyl cellulose resin, a solid polymer of an acrylate or methacrylate ester of a 1–4 carbon aliphatic alcohol, polyvinyl alcohol or polyvinyl butyral. Such resins are favored as temporary binders for the ceramic particles because they possess excellent burning properties and yield flexible green sheets which handle well. These resins are insoluble or only very slightly soluble in the vehicles of the present invention. Accordingly, application of the metallizing composition containing the vehicles of this invention in the formation of electrode patterns onto the thin green ceramic dielectric sheets has no deleterious effect upon such sheets during their handling in the stacking and compressing operations. Also, the resulting assembly of stacked and compressed sheets can be fired according to usual firing practices to burn out all organic matter and produce well formed, highly satisfactory monolithic capacitor structures.

DESCRIPTION OF THE PREFERRED EMBODIMENTS

The major component (first solvent) of the solvent mixture and correspondingly of the liquid vehicle must be an aliphatic hydrocarbon containing 6–16 carbon atoms. A large number of liquids were investigated for their ability to wet various bonded ceramic sheets, for their failure to attack the bonding resins, and for their ability to be viscosified to produce operable vehicles. Water attacks polyvinyl alcohol resin (occasionally used in ceramic dielectrics) and is very difficult to viscosify to form a workable screening vehicle. Most alcohols, ketones, terpene solvents, glycols, aromatic hydrocarbons and the like dissolve one or more of the common organic resin binders. The only liquids found that neither dissolve nor excessively penetrate the organic bonded ceramic sheets are the aliphatic hydrocarbons containing 6–16 carbon atoms; kerosene is a typical and preferred representative. Other suitable aliphatic hydrocarbons include: gasoline, hexane, heptane, octane, decane, dodecane, and hexadecane. All of these behave similarly and are operable for purposes of this invention. However, due to their expensiveness, the latter are not the preferred solvents of this invention.

To enhance the solubility of the other vehicle ingredients in the first solvent (aliphatic hydrocarbons), 10–60% of a second solvent selected from the group consisting of aromatic hydrocarbon solvents boiling in the range of 150–320° C. (at atmospheric pressure) or terpene solvents are added. However, since aromatic hydracarbons or terpene solvents attack the organic binder of the ceramic sheets, the amount of aromatic hydrocarbons or terpenes used in admixture with the aliphatic hydrocarbon must be carefully controlled for use on green ceramics; as for fired ceramics, a larger amount may be employed. The aromatic hydrocarbon solvents can comprise one aromatic compound or a mixture of aromatic hydrocarbon compounds which boil within the range of 150–320° C. The commerically available aromatic solvents usually include mixtures of aromatic hydrocarbons which boil within the range of 150–320° C. A preferred aromatic hydrocarbon solvent is the commercially designated "high flash naphtha" or "aromatic naphtha" which contains about 90% aromatic hydrocarbons. Examples of the terpene solvent include alpha-terpineol, beta-terpineol, pine oil, oil of cloves, oil of lavender, and the like.

It has been found that if an aromatic hydrocarbon solvent is used as the second solvent, 10–35% by weight of the solvent mixture (first and second solvent) should consist of said aromatic hydrocarbon solvent when applied to green ceramic sheets. A larger amount of an aromatic hydrocarbon solvent severely attacks the ceramic sheet while quantities less than 10% provide insufficient solvency for the other vehicle ingredients. The terpene solvents, being more powerful solvents, should comprise 3–10% by weight of the solvent mixture. A larger amount of a terpene solvent severely attacks the ceramic sheet while quantities less than 3% provide insufficient solvency for the other vehicle ingredients. On the other hand, if the vehicle is to be used on matured (fired) ceramic sheets, the amount of second solvent can comprise 35–60% of the solvent mixture. This is true regardless of whether an aromatic hydrocarbon or a terpene is used as the second solvent. Of course, where the second solvent is present in the 30–40% range, the vehicle system can usually be used on green ceramic sheets as well as fired ceramic sheets.

The vehicle for the particulate noble metal must include a temporary binder for the metal particles, which binder must be soluble in the solvent mixture. The binder must also be one which will volatilize or burn out cleanly during firing. Additionally, the binder must aid in providing the required viscosity for screen printing to the vehicle and must bond the precious metal powder together to the ceramic dielectric sheet. The most common binder for screen printing vehicles is ethyl cellulose; a similar material is ethyl hydroxy ethyl cellulose. These are relatively insoluble in the aliphatic hydrocarbons and only slightly soluble in the solvent mixture. It also has been found that appreciable quantities of a terpene resin which is solid at room temperature, such as rosin, hydrogenated rosin, or hydrogenated rosin esters, enhance the solubility of ethyl cellulose and ethyl hydroxy ethyl cellulose in the solvent mixture. For example, based on the weight of the vehicle, 30% hydrogenated rosin or glycerin ester of hydrogenated rosin will permit dissolving of 6–10% ethyl cellulose in a kerosene-aromatic naptha solvent; or 8% hydrogenated rosin will allow 12% ethyl hydroxy ethyl cellulose to be dissolved. The final viscosity of the vehicle in either case is 10,000 to 70,000 c.p.s. at room temperature, which are generally adequate viscosities.

The following are examples of liquid vehicles suitable for use in formulating metallizing compositions which are to be used on green ceramics. Staybelite and Staybelite Ester are commercial resins which are hydrogenated rosin and the glycerin ester of hydrogenated rosin, respectively.

| Example No. | Percent | | | | | |
|---|---|---|---|---|---|---|
| | 1 | 2 | 3 | 4 | 5 | 6 |
| Staybelite | 8 | 8 | | 30 | 8 | 30 |
| Stabelite ester | | | 30 | | | |
| Kerosene | 63.75 | 61 | 48 | 48 | 62 | 61.5 |
| Aromatic naphtha | 21.25 | 20 | 16 | 16 | 20 | |
| Beta terpineol | | | | | | 2.5 |
| Ethyl cellulose (200 cps.) | | | 6 | 6 | | 6 |
| Ethyl hydroxy ethyl cellulose | 7 | 11 | | | 10 | |

The above vehicle compositions were prepared by sifting the pulverized solids (binder and resin) into the solvent mixture while the latter was being stirred then continuing stirring at 50° C.–150° C. until the solids were completely dissolved.

The liquid vehicles are used to prepare metallizing compositions or noble metal electrode pastes. Any suitable amount of vehicle may be used, depending on the desired consistency. An approximate viscosity range of 20,000 to 500,000 c.p.s. has been found to be useful. The noble metal metallizing compositions are applied to the green dielectric ceramic sheet in the desired pattern form, e.g., by screen stencil printing or any other suitable manner, following which the solvent component of the metallizing composition will usually be essentially completely evaporated from the coating before the coating sheets are stacked, compressed and fired. However, in some instances the coated sheets are stacked before the solvent is evaporated, since the presence of the solvent assists in holding the sheet together before and during the compression and early firing operations.

The following metallizing compositions were prepared by admixing the appropriate proportions of powder metals and one of the above vehicles in a 3-roll paint mill to effect thorough dispersion of the metal(s) in the liquid vehicle. If the viscosity of the resulting paste is somewhat higher than desired, it can be lowered as desired by adding suitable amounts of the aliphatic hydrocarbon solvent (first solvent).

METALLIZING COMPOSITIONS
[Weight Percent]

| Example | 7 | 8 | 9 | 10 | 11 | 12 |
|---|---|---|---|---|---|---|
| Platinum powder | 60 | | | 60 | | |
| Palladium powder | | 60 | | | 60 | |
| Pt/Pd alloy powder [1] | | | 60 | | | 60 |
| Vehicle of Example 1 | 40 | | | | | |
| Vehicle of Example 2 | | 40 | | | | |
| Vehicle of Example 3 | | | 40 | | | |
| Vehicle of Example 4 | | | | 40 | | |
| Vehicle of Example 5 | | | | | 40 | |
| Vehicle of Example 6 | | | | | | 40 |

[1] An alloy containing 60% by weight platinum and 40% by weight palladium.

EXAMPLE 13

A flexible self-supporting green sheet of a low firing glass dielectric was prepared as follows: a glass frit is made by melting together 45.4 parts PbO, 23.6 parts $SiO_2$, 3.9 parts $K_2CO_3$, 3.9 parts NaF, 7.5 parts $MgCO_3$, 1.6 parts $Li_2CO_3$, 2.4 parts $Na_2CO_3$ and 11.7 parts $Sr(NO_3)_2$ until a clear fluid melt is obtained, which was fritted by pouring the melt into water. The resulting coarse frit was ball milled for 16 hours in a porcelain mill with porcelain balls and about ⅓ its weight of water, filtered, dried and crushed to a powder having an average particle size of about 5 microns. This frit was slurried in such an amount of a 10% solution of ethyl cellulose (200 c.p.s.) in acetone as would provide an amount of ethyl cellulose equal to 10% of the weight of the frit. The slurry was cast on a clean glass slab which had been previously coated with dilorol phosphate (a stripping agent) using a doctor blade that gives a film 5 mils thick. After drying and stripping from the glass slab, the flexible green sheet will have a thickness of about 4 mils.

Using the screen stencil technique, ½" x 1" electrode patterns of the platinum metallizing composition of Example 7 were printed upon several sections of the above green dielectric sheet. After drying, the printed sections were stacked so that about ⅞" of the patterns on successive sheets overlap, with about ⅛" of the pattern of alternate sheets extending to the right beyond the overlap area, and with about ⅛" of the pattern of the remaining sheets extending to the left beyond the overlap area. After 8 (or any desired number) printed sheets were stacked or "built up" in this manner with an unprinted top or cover sheet, the stack was carefully compressed under a pressure of about 300 p.s.i., then die cut so as to expose the electrode prints of alternate sheets on opposite ends of the stack. The stack was then slowly fired on an ethyl cellulose coated stainless steel plate from room temperature to 760° C. over a period of 16 hours.

The resulting monolithic capacitor structure consisted of 8 electrodes, each having a plate area of about ½" x ¾", with each being separated from each other by a ceramic layer about 4 mils thick having a dielectric constant of about 10. Except for the use of a green dielectric in preformed sheet form, this method of forming the monolithic capacitor structure is essentially that described in Deyrup, U.S. Pat. 2,389,420.

In forming a monolithic capacitor structure as described above, the platinum electrode composition does not attack, blister or perforate the green dielectric sheet during its application thereto or during the subsequent stacking, compressing and firing operation. Consequently, no curling, cracking, or other related difficulty was experienced in the entire operation by which the fired monolithic structure is obtained.

EXAMPLE 14

A green dielectric sheet was prepared essentially as described in Example 13, except that the solution in which the glass frit is slurried for casting was a 10% solution of polymethyl methacrylate in a solvent consisting of 40% methyl ethyl ketone, 29.3% butanol, 29.3% xylene and 1.4% dibutyl phthalate. Sections of the green sheet were printed as described in Example 13 but using the platinum- palladium alloy metallizing composition of Example 12. The printed sections were then processed as described in Example 13 to give a monolithic multiplate capacitor structure. No curling, blistering, or related problems were encountered.

EXAMPLE 15

The metallizing composition of Example 12 was printed on sections of green polymethyl methacrylate (PMA) bonded ceramic sheets as described in Example 13. The sheets contained 10% PMA, 85.5% barium strontium titanate and 4.5% bismuth stannate. The printed sheets were then processed (as in Example 13) to form a firm, compact monolithic multi-layer capacitor. No curling, blistering or related problems were encountered.

EXAMPLE 16

A vehicle for use on fired alumina chips was prepared. The vehicle ontained 10% Staybelite, 10% ethyl hydroxy ethyl cellulose, 40% beta terpineol and 40% kerosene. Eighty-three parts gold powder and 9 parts inorganic binder were dispersed in 8 parts of the vehicle. The inorganic binder consisted of 4.5% $Bi_2O_3$ and 4.5% glass frit which contained 65% PbO, 34% $SiO_2$ and 1% $Al_2O_3$. This metallizing composition was screen printed onto an alumina chip and fired at 850° C. Conductor patterns were obtained having good electrical conductivity, while no blistering or bubbling was encountered.

EXAMPLE 17

A vehicle for use on fired alumina chips was prepared. The vehicle contained 10% Staybelite, 10% ethyl hydroxy ethyl cellulose, 40% beta terpineol, 20% kerosene and 20% aliphatic hydrocarbons (240–265° C.). Forty parts silver powder, 22 parts palladium and 12 parts inorganic binder were dispersed in 26 parts of the vehicle. The inorganic binder consisted of a mixture of $Bi_2O_3$ and a cadmium borosilicate glass frit. This metallizing composition was screen printed onto an alumina chip and fired at 760° C. Conductor patterns were obtained having good electrical conductivity, good solderability; no blistering or bubbling was encountered.

In a further modification, the vehicles of this invention can also contain a thixotropic agent. Some metallizations require vehicles having fine line definition characteristics at viscosities which can be used on automatic and manual screen printing, and mask printing machines. Any conventional thixotropic agent can be used; typical exemplary agents include: hydrogenated castor oil (Thixotrol), esterified clay (Bentone) and colloidal silica (Cab-O-Sil). Other common thixotropic agents are disclosed by Eirich, "Rheology," vol. 4, page 457. An effective amount of thixotropic agent should be used; generally, this is up to 10% by weight of the vehicle. A typical thixotropic metallization can be prepared by any conventional procedure; the following example is illustrative of one such procedure.

EXAMPLE 18

A thixotropic vehicle was prepared by combining 10% Staybelite, 10% ethyl hydroxy ethyl cellulose, 40% beta-terpineol, 37% kerosene and 3% of Thixotrol ST (hydrogenated castor oil) into a container and heating to 100° C. This mixture was agitated and maintained at 100° C. until a homogeneous solution was obtained. This solution was allowed to cool to room temperature. Then, the solution was passed through a roll mill to shear the thixotropic agent into suspension.

To 10 parts of this vehicle was added 80 parts of gold powder and 10 parts of an inorganic binder (described in Example 16). This metallization was mask printed onto alumina chips (prefired) as 3 lines, each 2 mils wide and 2 mils apart. The chip was fired to 875° C. to yield high resolution conductor paths.

The vehicles of this invention can be used in place of the conventional vehicles now in use in the electronic industry. As previously pointed out, the vehicles can be used in metallizing compositions which contain finely divided noble metals, including palladium, platinum, gold, silver, ruthenium, rhodium, iridium, osmium, alloys thereof and mixtures thereof. These metallizations can contain any amount of inorganic binder. Typical inorganic binders include lead borate, lead silicate, lead borosilicate, cadmium borate, lead-cadmium borosilicate, zinc borosilicate, and sodium-cadmium borosilicate glasses, either alone or in combination with wetting agents such as bismuth oxide. The amount of inorganic binder is varied to provide the desired conductivity or resistivity. In addition, the vehicles of this invention can be used to disperse insulating materials or crystallizable ceramics to form dielectric compositions and other various insulating compositions. Thus, while the vehicles have a preferred utility in conductor metallizations for green ceramics or fired ceramics, they may also be utilized where other conventional vehicles are now used.

What is claimed is:

1. A vehicle comprising (A) 40–90% by weight of a solvent mixture which consists essentially of (1) a first solvent which is an aliphatic hydrocarbon containing 6–16 carbon atoms and (2) a second solvent from the group consisting of (a) an aromatic hydrocarbon solvent boiling in the range of 150–320° C., (b) a terpene solvent, and (c) a mixture thereof, said second solvent constituting 10–60% by weight of said solvent mixture; (B) 5–35% by weight of a terpene resin selected from the group consisting of rosin, hydrogenated rosin and the glycerin ester of hydrogenated rosin; (C) 4–15% by weight of a binder selected from the group consisting of ethyl cellulose and ethyl hydroxy ethyl cellulose; and (D) 0–10% by weight of a thixotropic agent.

2. A vehicle in accordance with claim 1 wherein the aliphatic hydrocarbon is kerosene.

3. A vehicle for metallizing compositions usable in forming electrodes on organic bonded ceramic substrates which are used in the formation of electrical capacitors comprising (A) 40–90% by weight of a solvent mixture which consists essentially of (1) a first solvent which is an aliphatic hydrocarbon containing 6–16 carbon atoms and (2) a second solvent from the group consisting of (a) an aromatic hydrocarbon solvent boiling in the range of 150–320° C., (b) a terpene solvent, and (c) a mixture thereof, said second solvent constituting 10–35% by weight of said solvent mixture when an aromatic hydrocarbon solvent is used and 3–10% by weight of said solvent mixture when a terpene solvent mixture when a terpene solvent is used; (B) 5–35% by weight of a terpene resin selected from the group consisting of rosin, hydrogenated rosin and the glycerin ester of hydrogenated rosin; (C) 4–15% by weight of a binder selected from the group consisting of ethyl cellulose and ethyl hydroxy ethyl cellulose; and (D) 0–10% by weight of a thixotropic agent.

4. A vehicle in accordance with claim 3 wherein the aliphatic hydrocarbon is kerosene.

5. A vehicle in accordance with claim 4 wherein the second solvent is aromatic naphtha, the terpene resin is hydrogenated rosin, and the binder is ethyl cellulose.

6. A vehicle in accordance with claim 4 wherein the terpene solvent is beta-terpineol, the terpene resin is hydrogenated rosin, and the binder is ethyl cellulose.

7. A vehicle in accordance with claim 4 wherein the aromatic hydrocarbon is aromatic naphtha, the terpene resin is hydrogenated rosin, and the binder is ethyl hydroxy ethyl cellulose.

8. A vehicle for metallizing compositions which are usable in forming microcircuitry on matured substrates comprising (A) 40–90% by weight of a solvent mixture which consists essentially of (1) a first solvent which is an aliphatic hydrocarbon containing 6–16 carbon atoms and (2) a second solvent from the group consisting of (a) an aromatic hydrocarbon solvent boiling in the range of 150–320° C., (b) a terpene solvent, and (c) a mixture thereof, said second solvent constituting 35–60% by weight of said solvent mixture; (B) 5–35% by weight of a terpene resin selected from the group consisting of rosin, hydrogenated rosin and the glycerin ester of hydrogenated rosin; (C) 4–15% by weight of a binder selected from the group consisting of ethyl cellulose and ethyl hydroxy ethyl cellulose; and (D) 0–10% by weight of a thixotropic agent.

9. A metallizing composition comprising a dispersion of a noble metal powder in the vehicle of claim 1.

10. A metallizing composition comprising a dispersion of a noble metal powder in the vehicle of claim 3.

11. A metallizing composition comprising a dispersion of a noble metal powder in the vehicle of claim 8.

12. A metallizing composition in accordance with claim 9 which contains an inorganic binder.

13. A metallizing composition in accordance with claim 11 which contains an inorganic binder.

14. A dielectric composition comprising an insulating material in particulate form dispersed in the vehicle in accordance with claim 1.

References Cited

UNITED STATES PATENTS

| | | | |
|---|---|---|---|
| 2,429,603 | 10/1947 | Borglin et al. | 106—174 |
| 3,110,837 | 11/1963 | Wollentin | 106—173 |

MORRIS LIEBMAN, Primary Examiner

H. H. FLETCHER, Assistant Examiner

U.S. Cl. X.R.

106—174, 193; 252—63, 63.2, 63.5